Sept. 16, 1924.
G. N. LIBBY
TREATMENT OF SULPHIDE ORE WITH NITRATES
Original Filed Feb. 9, 1916
1,508,561
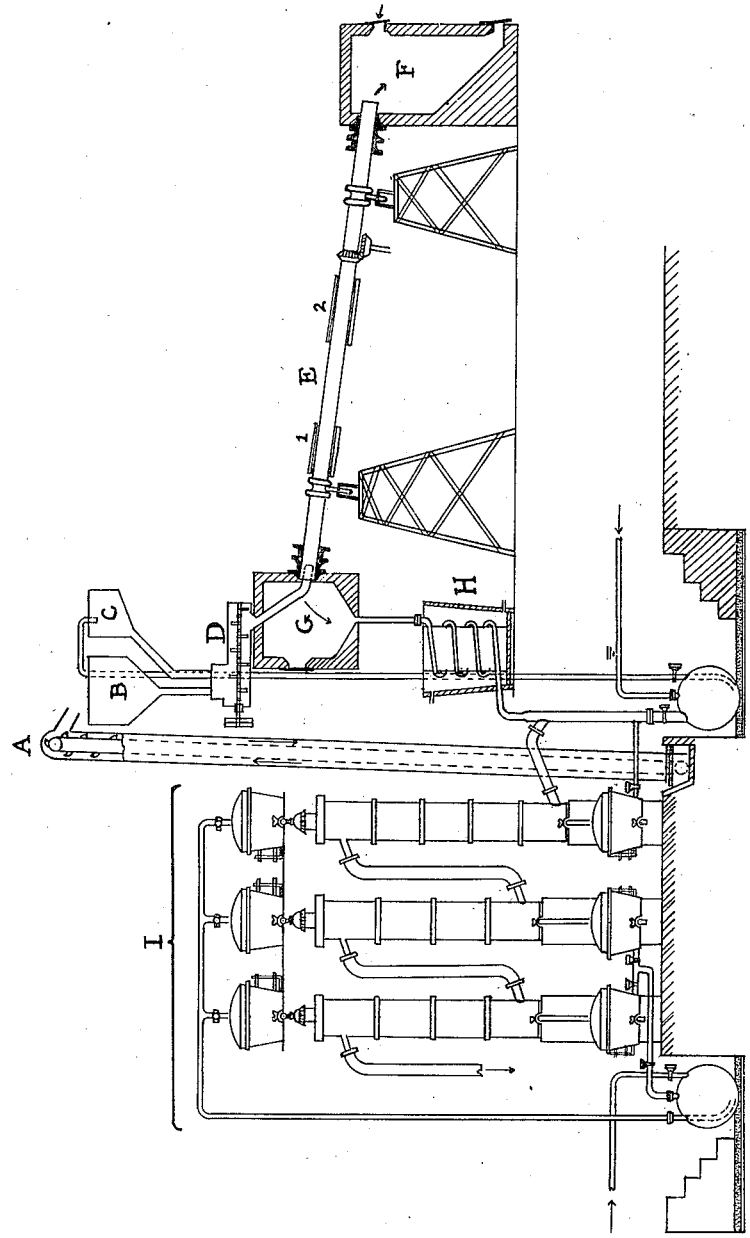
WITNESSES:
Nathan Nutling
Laura Bailar
INVENTOR
George Nelson Libby
BY
ATTORNEYS.

Patented Sept. 16, 1924.

1,508,561

UNITED STATES PATENT OFFICE.

GEORGE NELSON LIBBY, OF BERKELEY, CALIFORNIA.

TREATMENT OF SULPHIDE ORE WITH NITRATES.

Application filed February 9, 1916, Serial No. 77,167. Renewed June 19, 1922. Serial No. 569,325.

*To all whom it may concern:*

Be it known that I, GEORGE NELSON LIBBY, a citizen of the United States, and residing in the city of Berkeley, county of Alameda, State of California, have invented certain new and useful Improvements in the Treatment of Sulphide Ore with Nitrates.

My invention relates to the art of oxidizing metallic sulphides such for example, as iron and copper sulphides, with a nitrate such as nitric acid.

As is well known when a metallic sulphide such as copper sulphide is treated with nitric acid, the sulphide is oxidized to the sulphate and the nitric acid reduced to the lower oxides of nitrogen, which latter, upon coming in contact with air and water under suitable conditions, can be converted practically quantitatively back to the original nitric acid used. This recovered acid may, of course, be used in the treatment of more sulphide and the process repeated over and over again. The process hereinafter described is for the purpose of utilizing this cycle of reactions, in the treatment of a sulphide ore, so as to obtain the greatest efficiency of the oxygen carrying power of the nitrogen compounds, and at the same time render the valuable metals in the ore in a highly recoverable condition by leaching or otherwise.

I am aware that the general principle of oxidation of sulphide ore, by nitric acid, has been suggested before but the methods of treatment have contemplated the handling of the reacting mass essentially as a liquid under more or less vigorous agitation in tanks, kettles, or the like, under which condition it is asserted that for efficient recovery of the values, a pressure above that of the atmosphere must be maintained.

In my method on the contrary, the mass of ore is only sufficiently moistened to make it into a plastic mass or mud, and starting in this state, is subjected to a moderate heat in contact with air under which conditions it has been found quite practicable to carry out the desired reactions at ordinary atmospheric pressures and also to make the cool incoming plastic mass of fresh moist ore to act as an absorber for much of the oxides of nitrogen given off by the hotter portions of the reacting mass, i. e., those further advanced in the process of treatment.

In carrying out the process a sulphide ore, such as for example, slimes resulting from the milling of copper ore, is mixed or moistened at the ordinary temperature with the requisite amount of nitric acid or other nitrates and water, and the temperature of the resultant, more or less plastic mass, gradually raised to the reacting and volatilization temperature of the resulting nitrogen compounds. As these nitrogen oxide gases are evolved, air or air enriched with oxygen, is drawn through the apparatus in sufficient amount to oxidize the same, and these oxidized gases together with the water vapor present, made to come in contact with the cold incoming ore whereby they are almost entirely absorbed. The air carrying the unabsorbed portion is then passed through an absorption apparatus in which the recovery of the combined nitrogen gases is practically complete.

While I do not confine myself to any particular form of apparatus that shown in the sketch on an accompanying sheet, has been found to answer the purpose very well.

The reaction chamber E is of the rotary tube form somewhat similar to the rotary kiln of the Portland cement industry. The outer shell of this is of iron with a lining of a suitable acid resisting material, such as acid proof stone ware. The upper portion of the tube, whose function is essentially mixing and condensing, is cooled by means of a surrounding water jacket 1; and the lower or reaction portion provided with a steam jacket 2 for such heating as is required.

The condensing worm, H, absorption towers, I, and connections are in form and material similar to those used in present nitric acid practice and need not be described in detail.

Operation.

Ore is drawn from bin B into the mixing box D, and from the acid reservoir, C, sufficient acid for the reaction, above that caught in the reaction chamber, is run into the mixing box D, and the ore and acid intimately mixed and pugged into the cold upper end of the reaction chamber E. The temperature here is kept at low or about atmospheric temperature by means of the surrounding water jacket.

The rotation of the reaction chamber now causes the mixture to travel thru the chamber E to the hot steam jacketed end and exit into a suitable bin F. As the mass moves into the hot zone, the reaction commences and proceeds to completion at the exit, where the temperature is maintained at usually, about 100° C. but of course may be above or below this within a considerable range.

As the reacting mass moves downward thru the chamber, air entering the lower end moves upward, oxidizing the reduced nitrogen compounds by means of the oxygen and water present and sweeping the resultant products to the cold end of the tube where they are mostly condensed and mixed with the incoming ore, ready once more to perform their cycle of reduction and oxidation.

The exit air with the unabsorbed nitrogen oxide gases is passed thru the absorption apparatus G, H, I, where a practically complete recovery of the combined nitrogen is made.

The treated ore drops into a suitable storage bin, F, from whence it is drawn for lixiviation.

The time required for the reaction in the chamber depends, of course, on the physical condition of the ore but in the case of mill slimes, a satisfactory treatment has been made in less than three minutes.

After treating an iron copper sulphide ore, as described, the ore exits in the dry condition with the original sulphide sulphur changed to the sulphate and elemental condition. With a proper regulation of moisture, temperature, and air, the copper exists as soluble copper sulphate and the iron is mostly in the form of the insoluble basic sulphate and hydroxide. Consequently, on adding water to the treated material, essentially copper alone goes into solution, leaving the valueless iron with the gangue in the residue. The solution is then, of course, in a very favorable condition for treatment by any of the well known methods, e. g., electrolysis, precipitation with iron, precipitation as oxide or carbonate of copper with lime or limestone, etc.

Having thus described my invention what I claim as new and desire to secure by Letters Patent is:—

1. The process of sulphating values in ores which consists in moistening a sulphide ore with a nitrate solution and passing the same through a heated zone whereby the metal values are sulphated and oxides of nitrogen liberated.

2. The process of sulphating values in ores which consists in passing sulphide ores moistened with a nitrate solution through a heated zone to sulphate the metal values and liberate oxides of nitrogen and passing these oxides over moistened sulphide ore to impregnate the same with nitrates.

3. The process of sulphating ores which consists in passing sulphide ores moistened with a nitrate solution through a heated zone whereby metal sulphates are formed and oxides of nitrogen liberated, and passing the liberated oxides together with oxygen over moistened sulphide ores to impregnate the same.

GEORGE NELSON LIBBY.

Witnesses:
  NATHAN NUTTING,
  LAURA BAILOR,
  GEO. R. KNOWLES.